(No Model.)
I. BROOKE.
OVEN PLATE.
No. 487,911. Patented Dec. 13, 1892.
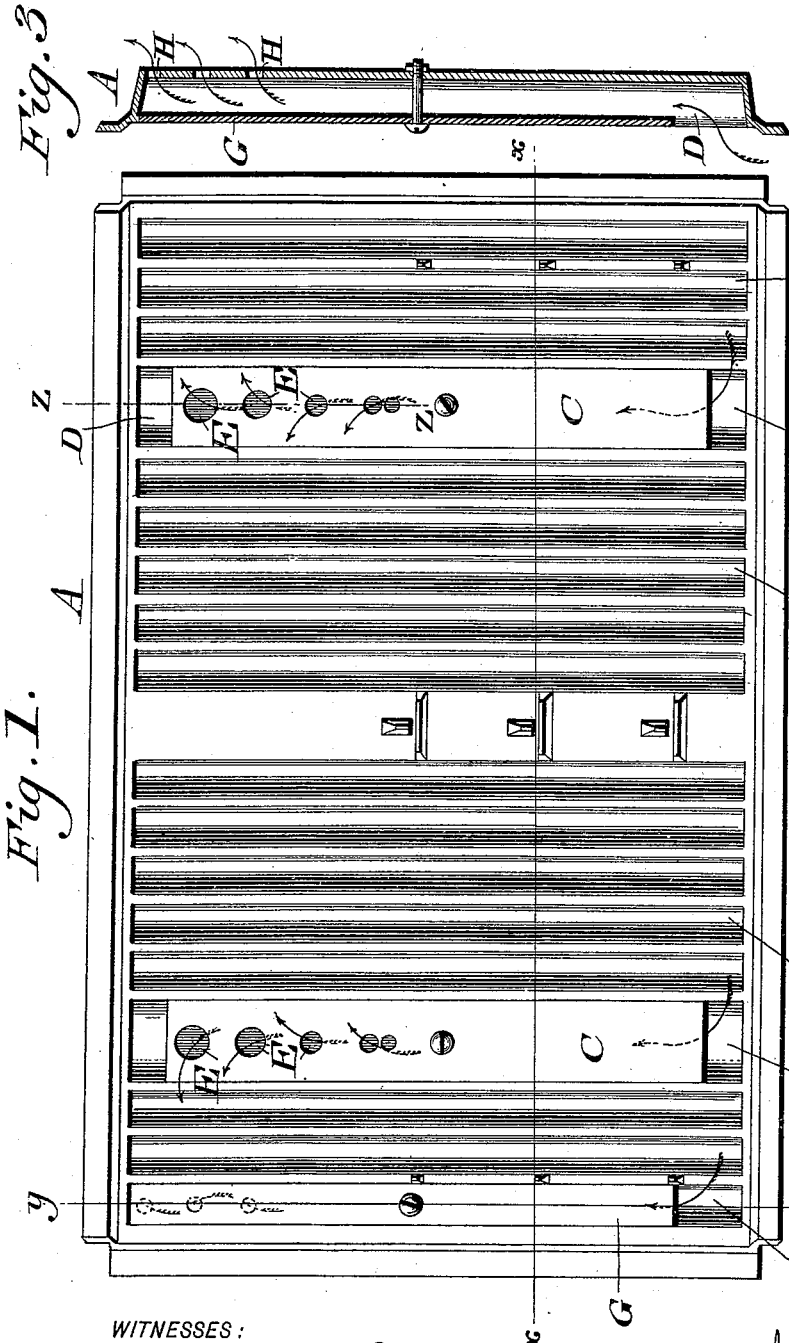
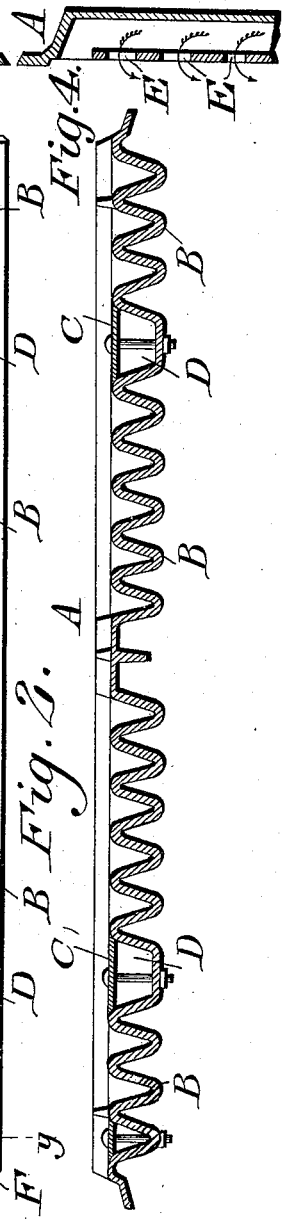
WITNESSES:
P. F. Nagle
L. Douville
INVENTOR
Isaac Brooke
BY
John A. Wiedersheim
ATTORNEY.
THE NORRIS PETERS CO., PHOTO-LITHO., WASHINGTON, D. C.

UNITED STATES PATENT OFFICE.

ISAAC BROOKE, OF POTTSTOWN, ASSIGNOR TO FLOYD, WELLS & COMPANY, OF ROYER'S FORD, PENNSYLVANIA.

OVEN-PLATE.

SPECIFICATION forming part of Letters Patent No. 487,911, dated December 13, 1892.

Application filed March 29, 1892. Serial No. 426,863. (No model.)

*To all whom it may concern:*

Be it known that I, ISAAC BROOKE, a citizen of the United States, residing at Pottstown, county of Montgomery, and State of Pennsylvania, have invented a new and useful Improvement in Oven-Plates, which improvement is fully set forth in the following specification and accompanying drawings.

My invention consists of the novel construction of an oven-plate of a stove or range, whereby the heating-surface of the same is increased.

It also consists in providing the plate with a flue or flues for causing a circulation of hot air in the oven.

Figure 1 represents a face view of an oven-plate embodying my invention. Fig. 2 represents a horizontal section on line $x\,x$, Fig. 1. Fig. 3 represents a vertical section on line $y\,y$. Fig. 4 represents a vertical section on line $z\,z$.

Similar letters of reference indicate corresponding parts in the several figures.

Referring to the drawings, A designates an oven-plate, the same being formed corrugated, as at B, whereby the heating-surface of the plate is vastly increased. To the walls of some of the corrugations are bolted or otherwise secured the plates C, which form the flues D, which are open at top and bottom and formed with passages E near the top, whereby hot air in the oven may enter said flues and escape therefrom, thus re-entering the oven and thereby causing a circulation of the hot air in the oven. A flue F is also formed by means of a plate G and the adjacent portion of the plate A, the same being open at bottom and closed at top. In the plate A are openings H, which are in communication with the exit-flue of the stove or range, so that some of the air may escape from the oven, and thus cause a draft in the latter, whereby fresh air may be drawn into the same.

Having thus described my invention, what I claim as new, and desire to secure by Letters Patent, is—

1. An oven-plate having a corrugated surface and plates secured to the inner face of the walls of the corrugations, forming flues open at top and bottom, said plates having openings therein, substantially as described.

2. An oven-plate having a corrugated surface, plates secured thereto on the inner face, forming flues open at top and bottom, and a plate secured to said oven-plate, forming a flue open at bottom and having an exit at top through an opening in the oven-plate, said parts being combined substantially as described.

ISAAC BROOKE.

Witnesses:
JOHN A. WIEDERSHEIM,
A. P. JENNINGS.